(12) United States Patent
Pretty (10) Patent No.: US 11,066,860 B1
(45) Date of Patent: Jul. 20, 2021

(54) HINGED ASSEMBLY WITH FAIL-SAFE HINGE PIN

(71) Applicant: Rohr, Inc., Chula Vista, CA (US)

(72) Inventor: Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 16/735,181

(22) Filed: Jan. 6, 2020

(51) Int. Cl.
| | | |
|---|---|---|
| *E05D 5/10* | (2006.01) | |
| *E05D 5/12* | (2006.01) | |
| *E05D 3/02* | (2006.01) | |
| *B64D 29/06* | (2006.01) | |

(52) U.S. Cl.
CPC ............ *E05D 5/128* (2013.01); *B64D 29/06* (2013.01); *E05D 3/02* (2013.01); *E05D 2005/102* (2013.01); *E05Y 2600/622* (2013.01); *E05Y 2900/502* (2013.01); *E05Y 2900/536* (2013.01)

(58) Field of Classification Search
CPC ............ Y10T 16/557; Y10T 16/5373; Y10T 16/537; E05D 5/10; E05D 3/02; E05D 2005/102; E05D 11/02; E05D 5/128; E05D 5/12; E05D 5/125; E05Y 2900/132; E05Y 2900/531; E05Y 2600/622; B64D 29/06

See application file for complete search history.

(56) References Cited

U.S. PATENT DOCUMENTS

| | | | | |
|---|---|---|---|---|
| 1,817,438 A | * | 8/1931 | Henry | .................... B60G 11/12 267/270 |
| 3,463,527 A | | 8/1969 | Baker | |
| 3,638,980 A | * | 2/1972 | Kleinhenn | ............... F16B 39/08 411/320 |
| 3,831,888 A | * | 8/1974 | Baker | .................... B64D 27/18 244/54 |
| 4,078,276 A | * | 3/1978 | Nunes | ....................... B60G 5/02 16/271 |
| 4,095,957 A | * | 6/1978 | Orsing | ................. A23B 4/0523 44/540 |
| 4,435,100 A | | 3/1984 | Cox | |
| 5,131,331 A | * | 7/1992 | Lynch, Jr. | ................ B61G 5/02 105/3 |
| 5,275,529 A | | 1/1994 | Langenbrunner | |
| 5,630,673 A | * | 5/1997 | Krzywanos | ............. E02F 9/006 403/154 |
| 6,694,571 B2 | * | 2/2004 | Albright | ................. E02F 9/006 16/380 |
| 6,931,897 B2 | | 8/2005 | Talpe | |
| 7,441,732 B2 | | 10/2008 | Ferragut | |

(Continued)

FOREIGN PATENT DOCUMENTS

| | | |
|---|---|---|
| EP | 2554479 B1 | 7/2016 |
| FR | 3094047 A3 * | 3/2019 |
| WO | 2018203946 A1 | 11/2018 |

*Primary Examiner* — Chuck Y Mah
(74) *Attorney, Agent, or Firm* — Getz Balich LLC (57) ABSTRACT

A pin assembly is provided with an axial centerline. This pin assembly includes an outer pin, an inner pin, a first collar and a second collar. The outer pin extends axially along the axial centerline between an outer pin first end and an outer pin second end. The inner pin extends axially along the axial centerline within a bore of the outer pin. The first collar circumscribes the outer pin. The first collar is connected to the outer pin and the inner pin at the outer pin first end. The second collar circumscribes the outer pin. The second collar is connected to the outer pin and the inner pin at the outer pin second end.

20 Claims, 7 Drawing Sheets

(56) References Cited

U.S. PATENT DOCUMENTS

| | | | |
|---|---|---|---|
| 8,002,217 B2 * | 8/2011 | Sternberger | F02K 1/70 |
| | | | 244/110 B |
| 8,128,022 B2 | 3/2012 | Bulin | |
| 8,492,664 B2 | 7/2013 | Mazelle | |
| 8,561,941 B2 * | 10/2013 | Combes | B64D 29/06 |
| | | | 244/54 |
| 8,615,846 B2 | 12/2013 | Wheeler | |
| 8,740,136 B2 * | 6/2014 | Audart-Noel | F16C 11/0695 |
| | | | 244/54 |
| 9,500,133 B2 | 11/2016 | Davis | |
| 9,556,902 B2 * | 1/2017 | Blunier | F16C 11/045 |
| 9,592,917 B2 * | 3/2017 | Cassagne | F16C 11/0614 |
| 9,593,708 B2 * | 3/2017 | Cassagne | F16B 39/24 |
| 9,765,808 B2 * | 9/2017 | Ginn | F16C 33/104 |
| 10,100,779 B2 * | 10/2018 | Alholm | F02K 1/1292 |
| 2018/0073545 A1 | 3/2018 | Buchanan | |
| 2019/0308739 A1 * | 10/2019 | Messina | F16C 11/04 |

* cited by examiner

HINGED ASSEMBLY WITH FAIL-SAFE HINGE PIN

BACKGROUND

1. Technical Field

This disclosure relates generally to a hinged assembly and, more particularly, to a hinged assembly with a fail-safe hinge pin.

2. Background Information

An aircraft propulsion system may include a hinged assembly for pivotally coupling a door to a fixed structure of a nacelle. Various types and configurations of hinged assemblies are known in the art. While these known hinged assemblies have various advantages, there is still room in the art for improvement. There is a need in the art therefore for improved hinged assemblies.

SUMMARY OF THE DISCLOSURE

According to an aspect of the present disclosure, a pin assembly is provided with an axial centerline. This pin assembly includes an outer pin, an inner pin, a first collar and a second collar. The outer pin extends axially along the axial centerline between an outer pin first end and an outer pin second end. The inner pin extends axially along the axial centerline within a bore of the outer pin. The first collar circumscribes the outer pin. The first collar is connected to the outer pin and the inner pin at the outer pin first end. The second collar circumscribes the outer pin. The second collar is connected to the outer pin and the inner pin at the outer pin second end.

According to another aspect of the present disclosure, a hinged assembly is provided that includes a first component, a second component and a hinge pin assembly. The hinge pin assembly pivotally connects the first component to the second component about an axial centerline of the hinge pin assembly. The hinge pin assembly includes an outer pin, an inner pin, a first collar and a second collar. The outer pin extends axially along the axial centerline between an outer pin first end and an outer pin second end. The inner pin extends axially along the axial centerline within a bore of the outer pin. The first collar is mounted on the outer pin at the outer pin first end. The first collar is secured to the outer pin and the inner pin. The second collar is mounted on the outer pin at the outer pin second end. The second collar is secured to the outer pin and the inner pin.

According to still another aspect of the present disclosure, a hinged assembly is provided for an aircraft. This hinged assembly includes a first component of the aircraft, a second component of the aircraft and a hinge pin assembly. The hinge pin assembly pivotally connects the first component to the second component about an axial centerline of the hinge pin assembly. The hinge pin assembly includes an outer pin, an inner pin, a collar and a fastener. The outer pin extends axially along the axial centerline between an outer pin first end and an outer pin second end. The inner pin extends axially along the axial centerline within a bore of the outer pin. The collar circumscribes the outer pin at the outer pin first end. The fastener projects sequentially out of an aperture in the collar, through an aperture in the outer pin and into an aperture in the inner pin.

A first fastener may be included and connect the first collar to the outer pin and the inner pin.

The first fastener may project from a sidewall of the first collar, through a sidewall of the outer pin and into the inner pin.

The first fastener may project sequentially through at least a first aperture in the first collar, a first aperture in the outer pin, an aperture in the inner pin, a second aperture in the outer pin and a second aperture in the first collar.

The first fastener may include a bolt and a nut.

A second fastener may be included and connect the second collar to the outer pin and the inner pin.

The inner pin may be configured with a solid core.

The inner pin may be configured with a bore that extends axially within the inner pin along the axial centerline.

An exterior surface of the inner pin may contact an interior surface of the outer pin.

An exterior surface of the outer pin may contact an interior surface of the first collar.

The hinge pin assembly may also include a first fastener connecting the first collar to the outer pin and the inner pin.

The first fastener may extend out from the first collar, through the outer pin and into the inner pin.

The first fastener may extend along an axis sequentially through at least the first collar, the outer pin, the inner pin, the outer pin and the first collar.

The first fastener may include a bolt and a nut. A head of the bolt may be adjacent a first side of the first collar. The nut may be adjacent a second side of the first collar that is diametrically opposite the first side of the first collar.

The first component may include a first mount and a second mount. The first mount may be configured with a first aperture. The second mount may be configured with a second aperture. The second component may include a third mount arranged between the first mount and the second mount. The third mount may be configured with a third aperture. The hinge pin assembly may project sequentially through the first aperture, the third aperture and the second aperture along the axial centerline.

The first mount may be axially between the first collar and the third mount. The first collar may be axially adjacent the first mount. The second mount may be axially between the second collar and the third mount. The second collar may be axially adjacent the second mount.

The first collar may axially engage the first mount. The first collar may also or alternatively be axially unloaded against the first mount.

The second collar may axially engage the second mount. The second collar may also or alternatively be axially unloaded against the second mount.

The first component may be configured as a fixed structure of an aircraft propulsion system. The second component may be configured as a nacelle door of the aircraft propulsion system.

The foregoing features and the operation of the invention will become more apparent in light of the following description and the accompanying drawings.

DETAILED DESCRIPTION

Figure 1:
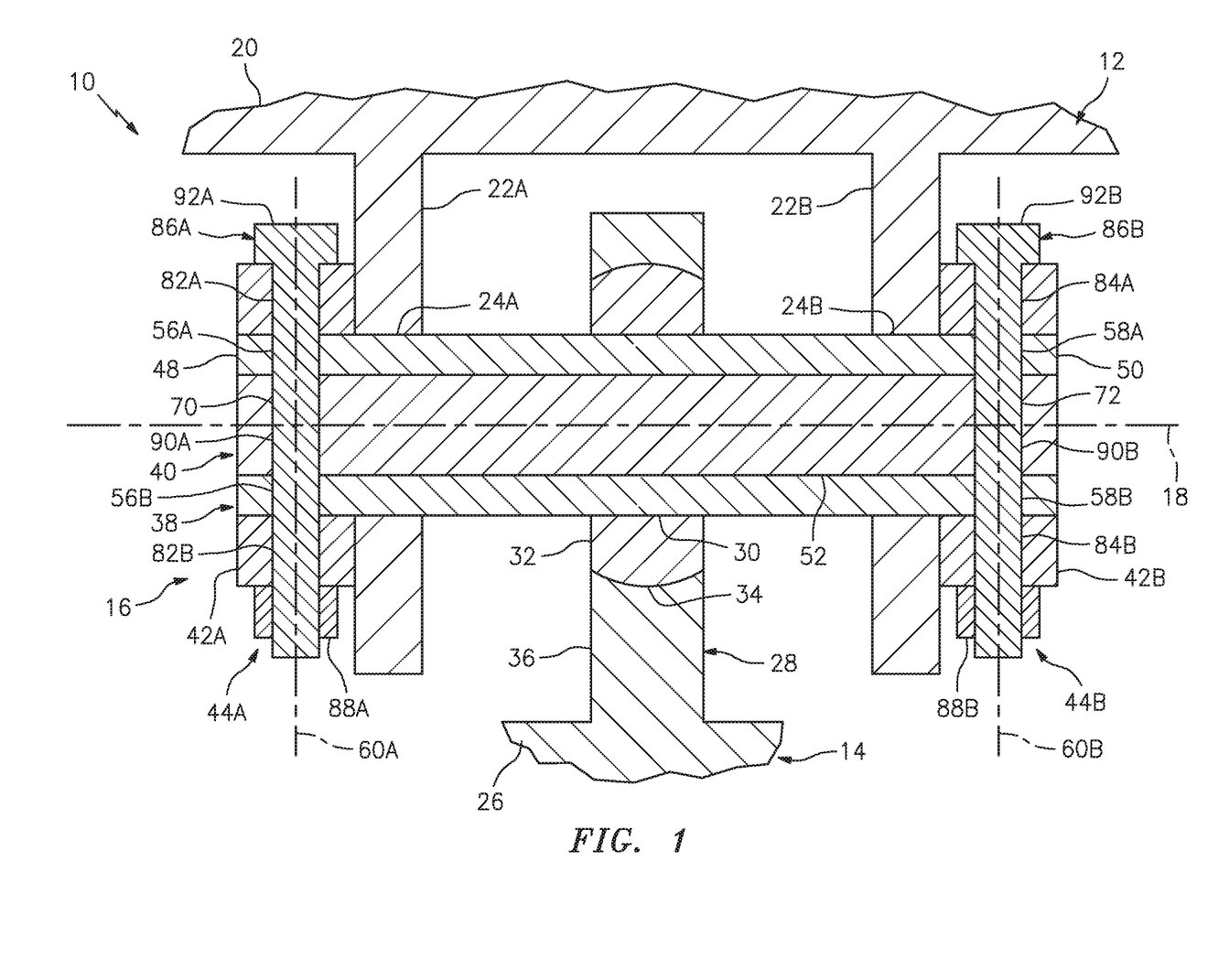
FIG. 1 is a side sectional illustration of a hinged assembly.

FIG. 1 is a side sectional illustration of a hinged assembly 10. The hinged assembly 10 includes a first component 12, a second component 14 and a hinge pin assembly 16. This hinge pin assembly 16 is configured to pivotally connect the first component 12 and the second component 14 together about an axial centerline 18 of the hinge pin assembly 16 as described below in further detail.

The first component 12 includes a first component base 20 and one or more first component mounts 22A and 22B (generally referred to as "22"); e.g., flanges. Each of the first component mounts 22 is connected to the first component base 20. Each of the first component mounts 22 projects out from the first component base 20 to a distal end of that respective first component mount 22. Each of the first component mounts 22 is configured with a respective first component mount aperture 24A and 24B (generally referred to as "24"). This first component mount aperture 24 extends axially along the axial centerline 18 through the respective first component mount 22. With the foregoing arrangement, the first component mounts 22 may be configured as a clevis; e.g., a U-shaped or V-shaped attachment. The present disclosure, however, is not limited to such an exemplary first component mount configuration.

Figure 2:
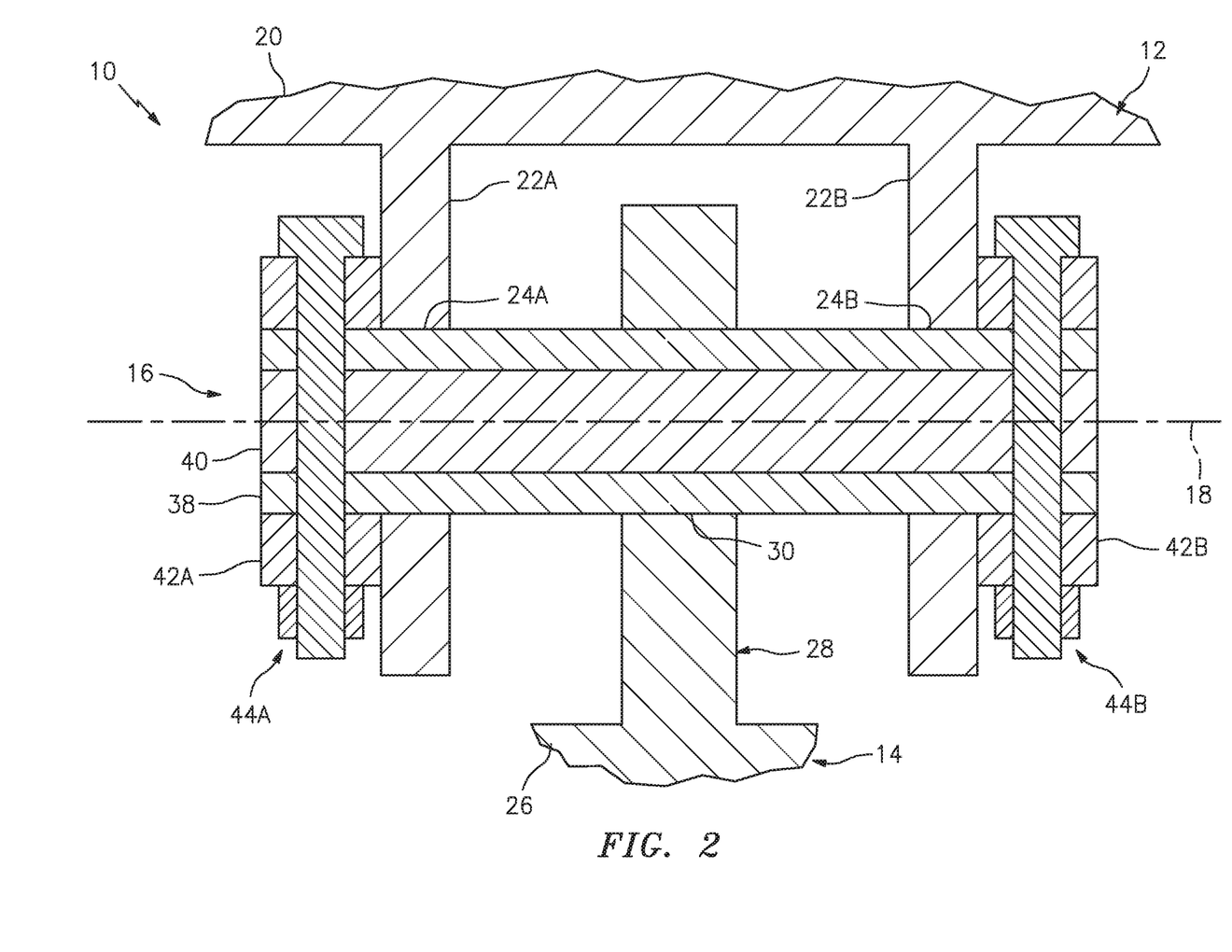
FIG. 2 is a side sectional illustration of another hinged assembly.

The second component 14 includes a second component base 26 and at least one second component mount 28; e.g., a flange. The second component mount 28 is connected to the second component base 26. The second component mount 28 projects out from the second component base 26 to a distal end of the second component mount 28. The second component mount 28 is configured with a respective second component mount aperture 30. This second component mount aperture 30 extends axially along the axial centerline 18 through the second component mount 28. In the specific embodiment of FIG. 1, the second component mount aperture 30 is formed by a bearing 32 (e.g., a spherical bearing) seated (e.g., swaged) in a receptacle 34 in a base 36 of the second component mount 28. The present disclosure, however, is not limited to such an exemplary second component mount configuration. For example, in other embodiments, the second component mount 28 may be configured without a spherical bearing as shown, for example, in FIG. 2.

The hinge pin assembly 16 may be configured as a fail-safe structural pin. The hinge pin assembly 16 of FIGS. 3-5, for example, includes an outer pin 38 (e.g., an outer clevis pin), an inner pin 40 (e.g., an inner clevis pin), a first collar 42A (e.g., retainer), a second collar 42B (e.g., retainer), a first fastener 44A and a second fastener 44B.

The outer pin 38 extends axially along the axial centerline 18 from a distal outer pin first end 48 to a distal outer pin second end 50. The outer pin 38 is configured with an outer pin bore 52 formed by a tubular sidewall 54 of the outer pin 38. This outer pin bore 52 extends axially along the axial centerline 18 within the outer pin 38. More particularly, the outer pin bore 52 of FIG. 3 extends axially along the axial centerline 18 completely through (or alternatively partially into) the outer pin 38 from the outer pin first end 48 to the outer pin second end 50.

Figure 3:
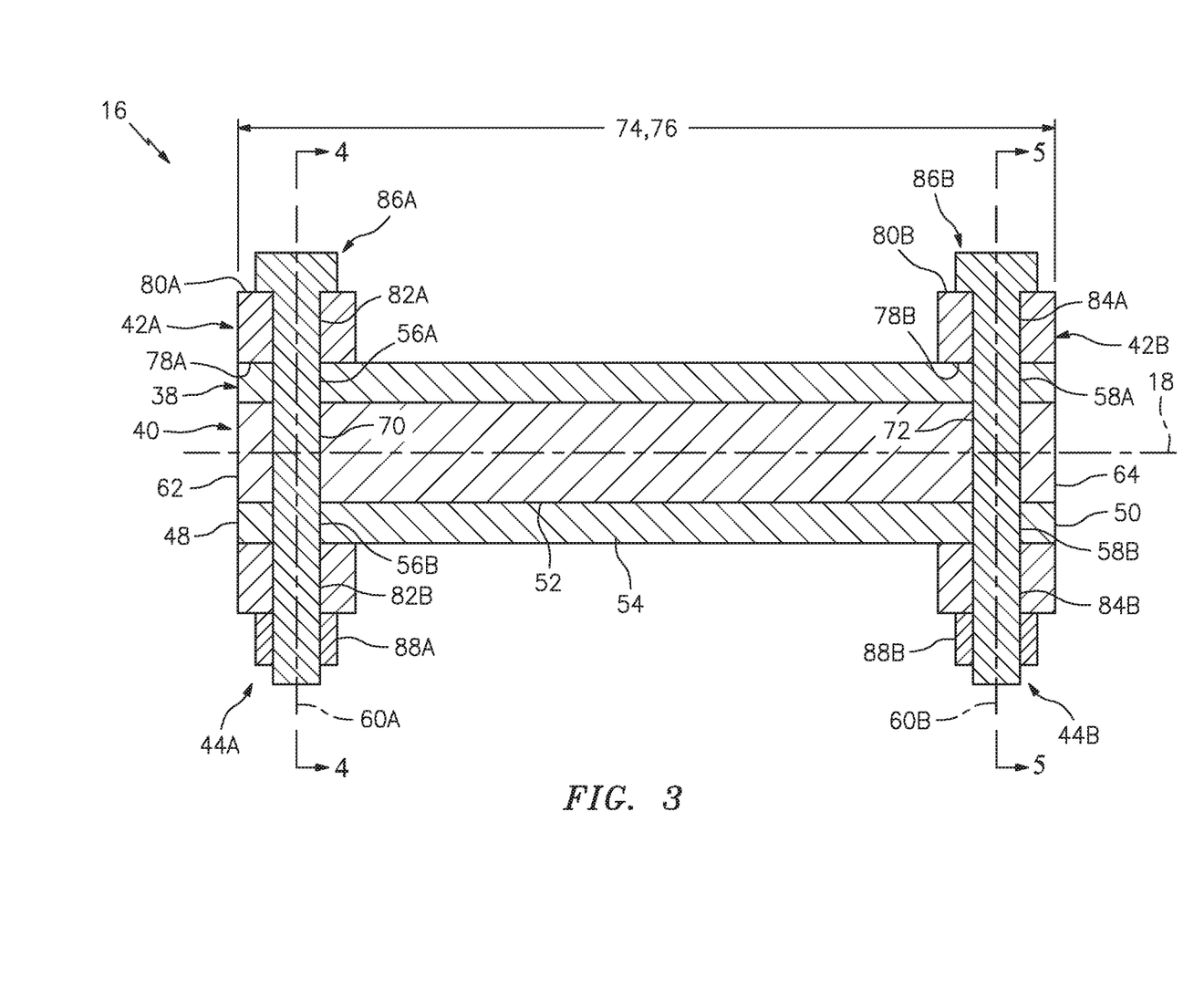
FIG. 3 is a side sectional illustration of a hinge pin.
Figure 4:
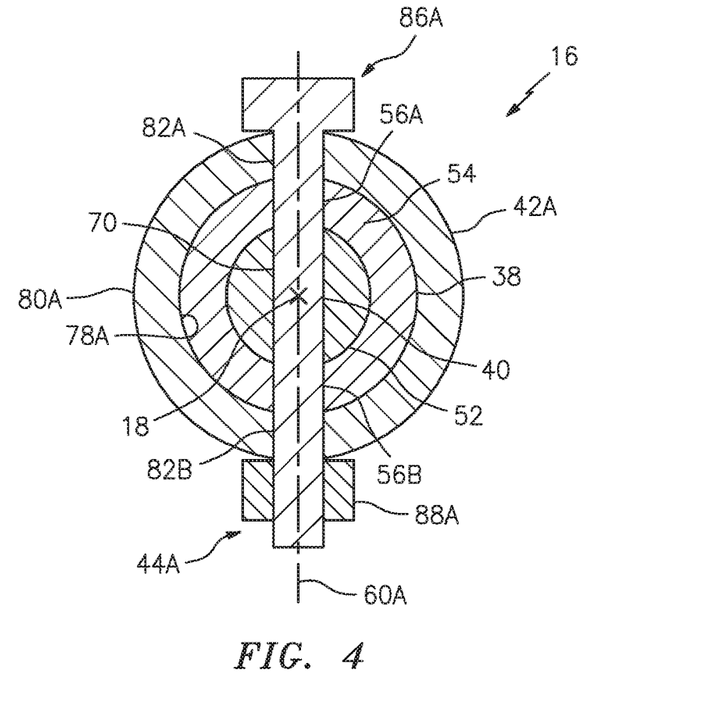
FIG. 4 is a cross-sectional illustration of the hinge pin taken along line 4-4 in FIG. 3.

The outer pin 38 is further configured with one or more first end apertures 56A and 56B (generally referred to as "56") (e.g., fastener apertures) and one or more second end apertures 58A and 58B (generally referred to as "58") (e.g., fastener apertures). The first end apertures 56 are located at (e.g., on, adjacent or proximate) the outer pin first end 48. The first end apertures 56 of FIGS. 3 and 4 are arranged coaxial with one another along a first fastener axis 60A, which first fastener axis 60A may be coincident with and/or perpendicular to the axial centerline 18. With this arrangement, the first end apertures 56 are diametrically opposed about the axial centerline 18. Each of the first end apertures 56 extends along the first fastener axis 60A (e.g., radially relative to the axial centerline 18) through a portion of the outer pin tubular sidewall 54.

Figure 5:
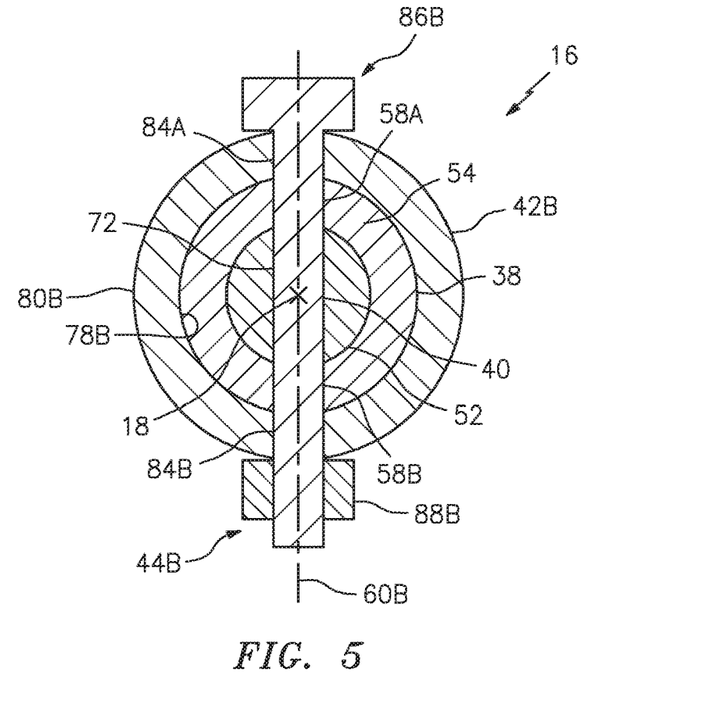
FIG. 5 is a cross-sectional illustration of the hinge pin taken along line 5-5 in FIG. 3.

The second end apertures 58 are located at (e.g., on, adjacent or proximate) the outer pin second end 50. The second end apertures 58 of FIGS. 3 and 5 are arranged coaxial with one another along a second fastener axis 60B, which second fastener axis 60B may be coincident with and/or perpendicular to the axial centerline 18 and/or parallel with the first fastener axis 60A. With this arrangement, the second end apertures 58 are diametrically opposed about the axial centerline 18. Each of the second end apertures 58 extends along the second fastener axis 60B (e.g., radially relative to the axial centerline 18) through a portion of the outer pin tubular sidewall 54.

The outer pin 38 may be constructed from a structural material such as, but not limited to, metal or composite material. The metal may be or otherwise include, but is not limited to, steel, stainless steel, nickel (Ni), titanium (Ti), aluminum (Al) and/or an alloy thereof. The present disclosure, however, is not limited to the foregoing exemplary outer pin materials.

Figure 6:
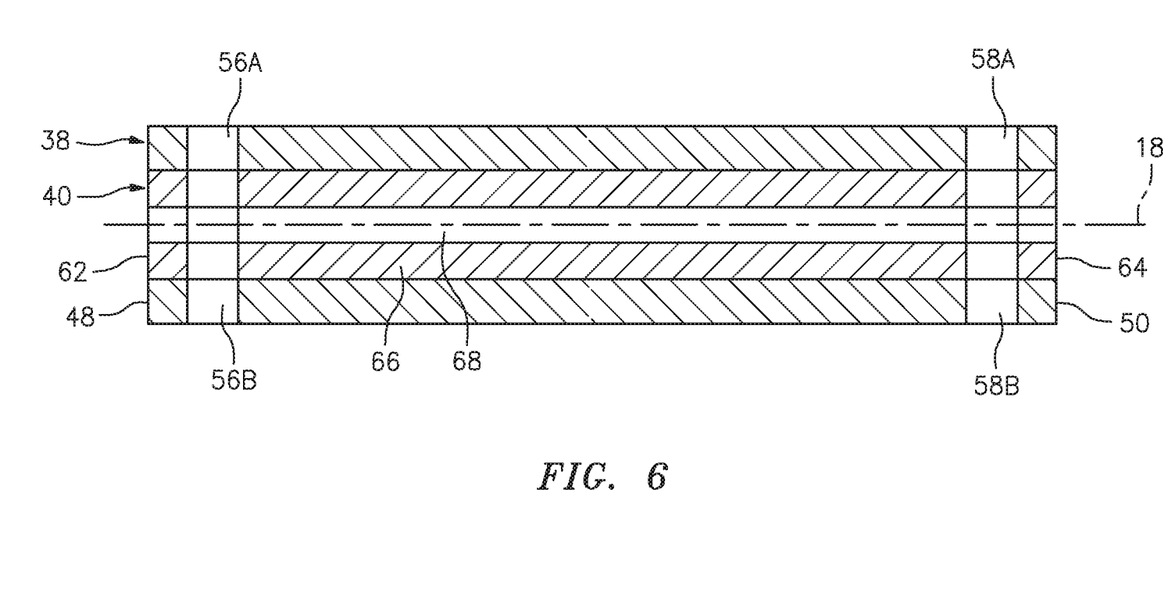
FIG. 6 is a side sectional illustration of an inner pin mated with an outer pin.

The inner pin 40 extends axially along the axial centerline 18 from a distal inner pin first end 62 to a distal inner pin second end 64. The inner pin 40 of FIGS. 3-5 is configured with a solid core; e.g., a solid body without an inner bore. Of course, in other embodiments, the inner pin 40 may be configured as a hollow body with an inner pin bore 68 as shown, for example, in FIG. 6. In such embodiments, the inner pin 40 may be configured—in a similar fashion as the outer pin 38—with a tubular sidewall 66 that forms its inner pin bore 68.

Referring to FIGS. 3-5, the inner pin 40 is further configured with at least one first end aperture 70 (e.g., fastener aperture) and at least one second end aperture 72 (e.g., fastener aperture). Referring now to FIGS. 3 and 4, the first end aperture 70 is located at (e.g., on, adjacent or proximate) the inner pin first end 62. The first end aperture 70 of FIGS. 3 and 4 is coaxial with the first fastener axis 60A and, thus, the first end apertures 56 in the outer pin 38. The first end aperture 70 extends along the first fastener axis 60A (e.g., radially relative to the axial centerline 18) through the inner pin 40.

Referring to FIGS. 3 and 5, the second end aperture 72 is located at (e.g., on, adjacent or proximate) the inner pin second end 64. The second end aperture 72 of FIGS. 3 and 5 is coaxial with the second fastener axis 60B and, thus, the second end apertures 58 in the outer pin 38. The second end aperture 72 extends along the second fastener axis 60B (e.g., radially relative to the axial centerline 18) through the inner pin 40.

Referring to FIG. 3, the inner pin 40 has an inner pin length 74 that extends/is defined axially along the axial centerline 18 between the inner pin first end 62 and the inner pin second end 64. This inner pin length 74 may be equal to an outer pin length 76 of the outer pin 38, which outer pin length 76 extends/is defined axially along the axial centerline 18 between the outer pin first end 48 and the outer pin second end 50. Of course, in other embodiments, the inner pin length 74 may be (e.g., slightly) longer than or shorter than the outer pin length 76.

The inner pin 40 may be constructed from a structural material such as, but not limited to, metal or composite material. The metal may be or otherwise include, but is not limited to, steel, nickel (Ni), titanium (Ti), aluminum (Al) and/or an alloy thereof. The present disclosure, however, is not limited to the foregoing exemplary inner pin materials. In some embodiments, the inner pin material may be the same as the outer pin material. In other embodiments, the inner pin material may be different than the outer pin material.

Referring to FIGS. 3 and 4, the first collar 42A is configured as an annular body; e.g., a sleeve/washer like member. The first collar 42A extends axially along the axial centerline 18 between opposing ends. The first collar 42A extends radially relative to the axial centerline 18 between an inner side 78A and an outer side 80A.

The first collar 42A is configured with one or more first collar apertures 82A and 82B (generally referred to as "82"); e.g., fastener apertures. The first collar apertures 82 of FIGS. 3 and 4 are arranged coaxial with one another along the first fastener axis 60A. With this arrangement, the first collar apertures 82 are diametrically opposed about the axial centerline 18. Each of the first collar apertures 82 extends along the first fastener axis 60A (e.g., radially relative to the axial centerline 18) through a portion of a tubular sidewall of the first collar 42A.

The first collar 42A may be constructed from a structural material such as, but not limited to, metal or composite material. The metal may be or otherwise include, but is not limited to, steel, nickel (Ni), titanium (Ti), aluminum (Al) and/or an alloy thereof. The present disclosure, however, is not limited to the foregoing exemplary first collar materials. In some embodiments, the first collar material may be the same as the inner pin and/or the outer pin materials. In other embodiments, the first collar material may be different than the inner pin and/or the outer pin materials.

Referring to FIGS. 3 and 5, the second collar 42B is configured as an annular body; e.g., a sleeve/washer like member. The second collar 42B extends axially along the axial centerline 18 between opposing ends. The second collar 42B extends radially relative to the axial centerline 18 between an inner side 78B and an outer side 80B.

The second collar 42B is configured with one or more second collar apertures 84A and 84B (generally referred to as "84"); e.g., fastener apertures. The second collar apertures 84 of FIGS. 3 and 5 are arranged coaxial with one another along the second fastener axis 60B. With this arrangement, the second collar apertures 84 are diametrically opposed about the axial centerline 18. Each of the second collar apertures 84 extends along the second fastener axis 60B (e.g., radially relative to the axial centerline 18) through a portion of a tubular sidewall of the second collar 42B.

The second collar 42B may be constructed from a structural material such as, but not limited to, metal or composite material. The metal may be or otherwise include, but is not limited to, steel, nickel (Ni), titanium (Ti), aluminum (Al) and/or an alloy thereof. The present disclosure, however, is not limited to the foregoing exemplary second collar materials. In some embodiments, the second collar material may be the same as the first collar, the inner pin and/or the outer pin materials. In other embodiments, the first collar material may be different than the first collar, the inner pin and/or the outer pin materials.

The first fastener 44A of FIGS. 3 and 4 includes a first bolt 86A and a first nut 88A. The present disclosure, however, is not limited to such an exemplary first fastener configuration. For example, in other embodiments, the first fastener 44A may alternatively be configured as a rivet, a set screw, a cotter pin, an interference fit pin or any other suitable fastener.

The second fastener 44B of FIGS. 3 and 5 includes a second bolt 86B and a second nut 88B. The present disclosure, however, is not limited to such an exemplary second fastener configuration. For example, in other embodiments, the second fastener 44B may alternatively be configured as a rivet, a set screw, a cotter pin, an interference fit pin or any other suitable fastener.

During installation of the hinge pin assembly 16 of FIG. 1, the second component mount 28 is arranged axially between the first component mounts 22. The second component mount aperture 30 is aligned with the first component mount apertures 24 such that those apertures 30 and 24 are coaxial with the axial centerline 18. The outer pin 38 is mated with the first component mounts 22 and the second component mount 28 such that the outer pin 38 projects axially along the axial centerline 18 sequentially through the component mount apertures 24A, 30 and 24B. With this arrangement, an exterior surface of the outer pin 38 may radially engage (e.g., contact) interior surfaces of the mounts 22. The inner pin 40 is mated with the outer pin 38 such that the inner pin 40 projects axially along the axial centerline 18 within/through the outer pin 38 and its bore 52. With this arrangement, an exterior surface of the inner pin 40 may radially engage (e.g., contact) an interior surface of the outer pin 38.

The first collar 42A is mounted to the outer pin 38 at its first end 48 and thereby circumscribes (e.g., extends circumferentially around) the outer pin 38. An interior surface of the first collar 42A may radially engage (e.g., contact) the exterior surface of the outer pin 38.

The first fastener 44A is mated with the first collar 42A, the outer pin 38 and the inner pin 40 so as to secure/fasten the first collar 42A to both the outer pin 38 and the inner pin 40. In particular, a shank 90A of the first bolt 86A projects along the first fastener axis 60A sequentially through the apertures 82A, 56A, 70, 56B and 82B to a distal shank end. The first nut 88A is threaded onto the shank 90A at the distal shank end so as to secure the first bolt 86A with the hinge pin assembly 16. With this arrangement, a head 92A of the first bolt 86A is adjacent and/or abutted against a first side of the first collar 42A and the first nut 88A is adjacent and/or abutted against a second side of the first collar 42A, where the second side is diametrically opposite the first side relative to the axial centerline 18.

Once secured to the outer pin 38 and the inner pin 40, the first collar 42A is located adjacent a respective one of the first component mounts; e.g., 22A. The first collar 42A may also axially abut and/or engage (e.g., contact) the respective first component mount 22A. However, the first collar 42A need not press axially against (e.g., may be axially unloaded against) the respective first component mount 22A. In other words, the first collar 42A may be configured axially loosely against/next to the respective first component mount 22A. The first collar 42A thereby does not push the respective first component mount 22A axially towards the other first component mount 22B.

The second collar 42B is mounted to the outer pin 38 at its second end 50 and thereby circumscribes (e.g., extends circumferentially around) the outer pin 38. An interior surface of the second collar 42B may radially engage (e.g., contact) the exterior surface of the outer pin 38.

The second fastener 44B is mated with the second collar 42B, the outer pin 38 and the inner pin 40 so as to secure/fasten the second collar 42B to both the outer pin 38 and the inner pin 40. In particular, a shank 90B of the second bolt 86B projects along the second fastener axis 60B sequentially through the apertures 84A, 58A, 72, 58B and 84B to a distal shank end. The second nut 88B is threaded onto the shank 90B at the distal shank end so as to secure the second bolt 86B with the hinge pin assembly 16. With this arrangement, a head 92B of the second bolt 86B is adjacent and/or abutted against a first side of the second collar 42B and the second nut 88B is adjacent and/or abutted against a second side of the second collar 42B, where the second side is diametrically opposite the first side relative to the axial centerline 18.

Once secured to the outer pin 38 and the inner pin 40, the second collar 42B is located adjacent a respective one of the first component mounts; e.g., 22B. The second collar 42B may also axially abut and/or engage (e.g., contact) the respective first component mount 22B. However, the second collar 42B need not press axially against (e.g., may be axially unloaded against) the respective first component mount 22B. In other words, the second collar 42B may be configured axially loosely against/next to the respective first component mount 22B. The second collar 42B thereby does not push the respective first component mount 22B axially towards the other first component mount 22A.

Figure 7:
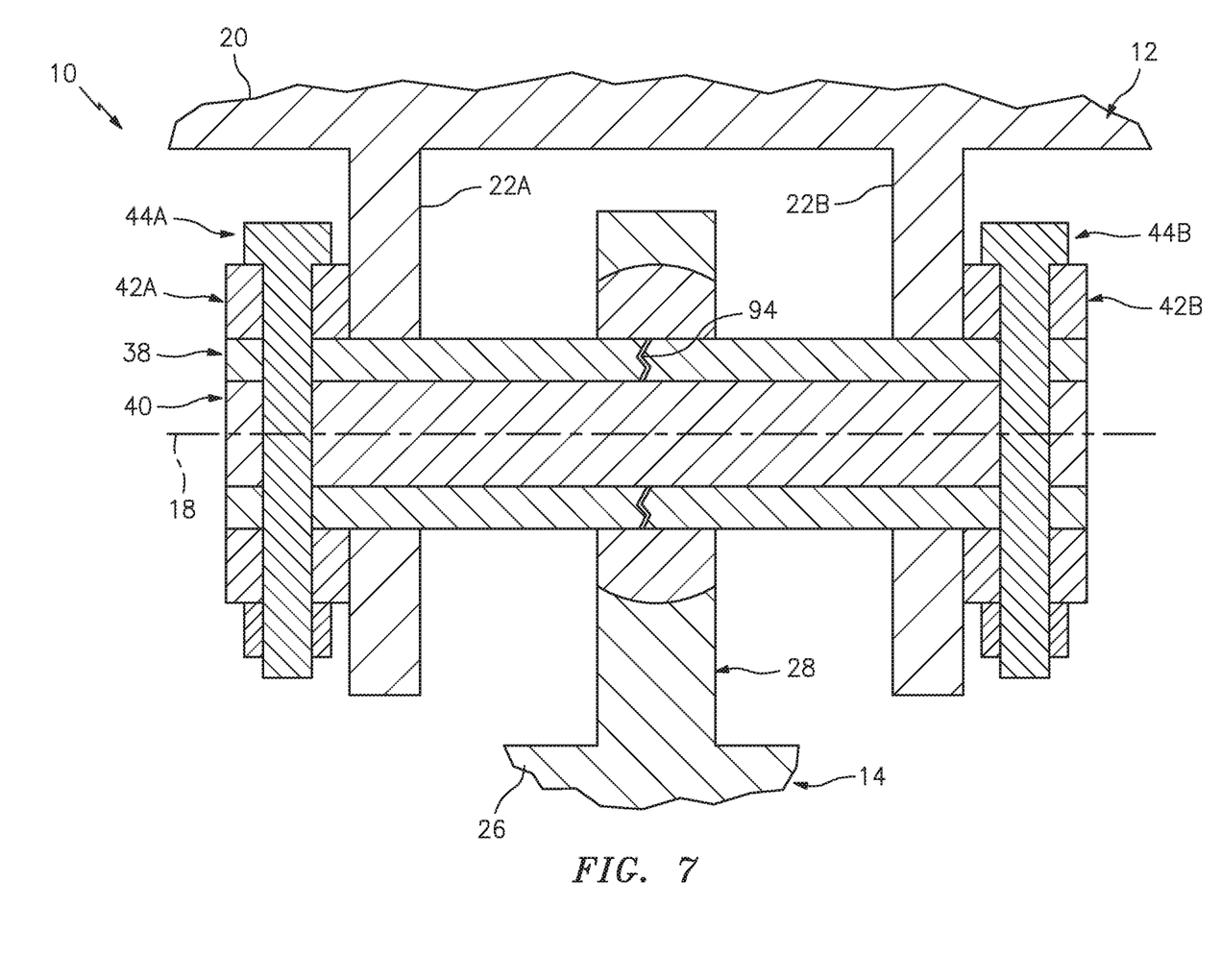
FIG. 7 is a side sectional illustration of the hinged assembly of FIG. 1 in an outer pin failed condition.

Under normal operating conditions, the outer pin 38 structurally connects and transfers loads between the first component 12 and the second component 14. However, referring to FIG. 7, severe and/or repeated thermally and/or vibratory induced movements between the first component 12 and the second component 14 may fatigue the outer pin 38 and cause a fracture 94 (e.g., a crack or a break) to form therein. In such a circumstance, the inner pin 40 provides a fail-safe for the outer pin 38 and structurally connects and transfers loads between the first component 12 and the second component 14. Furthermore, because the inner pin 40 may be loosely fit within and/or not interference fit with the outer pin 38, the fracture 94 in the outer pin 38 typically will not propagate into the inner pin 40.

Figure 8:
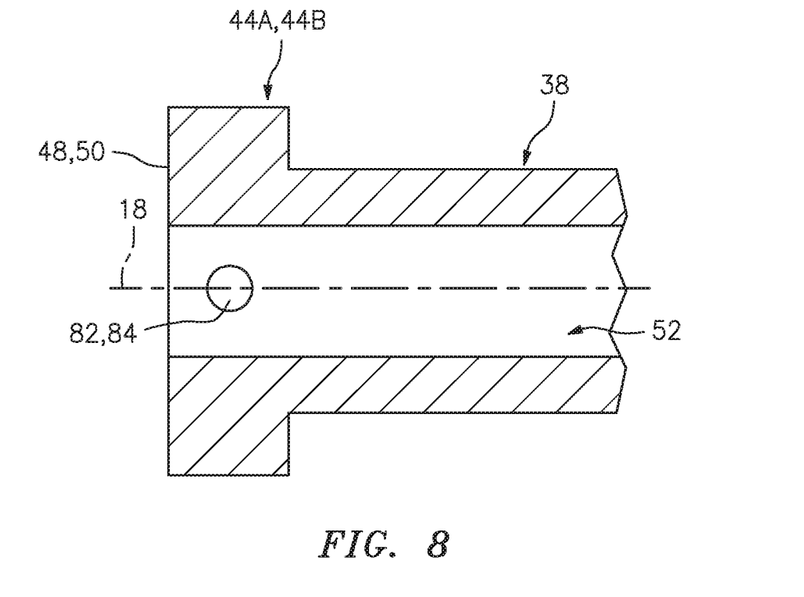
FIG. 8 is a side sectional illustration of an end portion of another outer pin.

In some embodiments, as described above, the first collar 42A and the second collar 42B are formed as discrete bodies from the outer pin 38 and then mounted to the outer pin 38. However, referring to FIG. 8, one of the collars 42 may alternatively be formed integral with the outer pin 38 as a unitary body.

The hinge pin assembly 16 of the present disclosure has various advantages over a traditional bolt hinge pin assembly. For example, as described above, the hinge pin assembly 16 of the present disclosure need not axially squeeze the first component mounts 22 together as compared to a traditional threaded hinge pin. The hinge pin assembly 16 may be installed where there is restricted tool access since large wrenches are not required. Furthermore, since the fasteners 44 project radially through the elements 38, 40 and 42, the rotation of the hinge pin assembly 16 about its axial centerline 18 will not cause the assembly 16 to loosen. Thus, the hinge pin assembly 16 of the present disclosure does not require additional anti-rotation features.

The hinged assembly 10 and/or the hinge pin assembly 16 of the present disclosure may be configured for various application. For example, the hinged assembly 10 may be used for an aircraft and, more particularly, an aircraft propulsion system application. One of the components 12, 14, for example, may be configured as an inner fixed structure of a nacelle and the other one of the components 14, 12 may be configured as a nacelle door; e.g., a thrust reverser section or a cowl door. The present disclosure, however, is not limited to such an exemplary application, nor more generally to aircraft propulsion system nor aircraft applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A pin assembly with an axial centerline, comprising:
an outer pin extending axially along the axial centerline between an outer pin first end and an outer pin second end;
an inner pin extending axially along the axial centerline within a bore of the outer pin;
a first collar circumscribing the outer pin, the first collar connected to the outer pin and the inner pin at the outer pin first end;
a second collar circumscribing the outer pin, the second collar connected to the outer pin and the inner pin at the outer pin second end; and
a first fastener connecting the first collar to the outer pin and the inner pin;
wherein the first fastener projects from a sidewall of the first collar, through a sidewall of the outer pin and into the inner pin.

2. A pin assembly with an axial centerline, comprising:
an outer pin extending axially along the axial centerline between an outer pin first end and an outer pin second end;
an inner pin extending axially along the axial centerline within a bore of the outer pin;
a first collar circumscribing the outer pin, the first collar connected to the outer pin and the inner pin at the outer pin first end;
a second collar circumscribing the outer pin, the second collar connected to the outer pin and the inner pin at the outer pin second end; and
a first fastener connecting the first collar to the outer pin and the inner pin;
wherein the first fastener projects sequentially through at least a first aperture in the first collar, a first aperture in the outer pin, an aperture in the inner pin, a second aperture in the outer pin and a second aperture in the first collar.

3. A hinged assembly, comprising:
a first component;
a second component; and
the pin assembly of claim 2 pivotally connecting the first component to the second component about the axial centerline.

4. The hinged assembly of claim 3, wherein
the first component comprises a first mount and a second mount, the first mount is configured with a first aperture, and the second mount is configured with a second aperture;
the second component comprises a third mount arranged between the first mount and the second mount, and the third mount is configured with a third aperture; and
the pin assembly projects sequentially through the first aperture, the third aperture and the second aperture along the axial centerline.

5. The hinged assembly of claim 3, wherein
the first component is configured as a fixed structure of an aircraft propulsion system; and
the second component is configured as a nacelle door of the aircraft propulsion system.

6. A pin assembly with an axial centerline, comprising:
an outer pin extending axially along the axial centerline between an outer pin first end and an outer pin second end;
an inner pin extending axially along the axial centerline within a bore of the outer pin;
a first collar circumscribing the outer pin, the first collar connected to the outer pin and the inner pin at the outer pin first end;
a second collar circumscribing the outer pin, the second collar connected to the outer pin and the inner pin at the outer pin second end; and
a first fastener connecting the first collar to the outer pin and the inner pin;
wherein the first fastener comprises a bolt and a nut.

7. A hinged assembly, comprising:
a first component;
a second component; and
the pin assembly of claim 6 pivotally connecting the first component to the second component about the axial centerline.

8. The hinged assembly of claim 7, wherein
the first component is configured as a fixed structure of an aircraft propulsion system; and
the second component is configured as a nacelle door of the aircraft propulsion system.

9. The pin assembly of claim 1, further comprising a second fastener connecting the second collar to the outer pin and the inner pin.

10. The pin assembly of claim 1, wherein the inner pin is configured with a solid core.

11. The pin assembly of claim 1, wherein the inner pin is configured with a bore that extends axially within the inner pin along the axial centerline.

12. The pin assembly of claim 1, wherein an exterior surface of the inner pin contacts an interior surface of the outer pin.

13. The pin assembly of claim 1, wherein an exterior surface of the outer pin contacts an interior surface of the first collar.

14. A hinged assembly, comprising:
a first component;
a second component; and
the pin assembly of claim 1 pivotally connecting the first component to the second component about the axial centerline.

15. The hinged assembly of claim 14, wherein the first fastener extends along an axis sequentially through at least the first collar, the outer pin, the inner pin, the outer pin and the first collar.

16. The hinged assembly of claim 14, wherein
the first fastener comprises a bolt and a nut;
a head of the bolt is adjacent a first side of the first collar; and
the nut is adjacent a second side of the first collar that is diametrically opposite the first side of the first collar.

17. The hinged assembly of claim 14, wherein
the first component comprises a first mount and a second mount, the first mount is configured with a first aperture, and the second mount is configured with a second aperture;
the second component comprises a third mount arranged between the first mount and the second mount, and the third mount is configured with a third aperture; and
the pin assembly projects sequentially through the first aperture, the third aperture and the second aperture along the axial centerline.

18. The hinged assembly of claim 17, wherein
the first mount is axially between the first collar and the third mount, and the first collar is axially adjacent the first mount; and
the second mount is axially between the second collar and the third mount, and the second collar is axially adjacent the second mount.

19. The hinged assembly of claim 17, wherein
the first collar axially engages, but is axially unloaded against, the first mount; and
the second collar axially engages, but is axially unloaded against, the second mount.

20. The hinged assembly of claim 14, wherein
the first component is configured as a fixed structure of an aircraft propulsion system; and
the second component is configured as a nacelle door of the aircraft propulsion system.

\* \* \* \* \*